United States Patent
de Pietro et al.

[19]

[11] Patent Number: 5,969,460
[45] Date of Patent: Oct. 19, 1999

[54] ELECTRIC MACHINE WITH A BRACED OVERHANG

[75] Inventors: Rolf de Pietro, Rupperswil; Albert Kopp, Windisch, both of Switzerland

[73] Assignee: Asea Brown Boveri AG, Baden, Switzerland

[21] Appl. No.: 09/206,346

[22] Filed: Dec. 7, 1998

[30] Foreign Application Priority Data

Dec. 15, 1997 [DE] Germany .......................... 197 55 569

[51] Int. Cl.⁶ .................................................. H02K 3/46
[52] U.S. Cl. ............................................. 310/270; 310/26
[58] Field of Search ..................................... 310/260, 270

[56] References Cited

U.S. PATENT DOCUMENTS

| | | | |
|---|---|---|---|
| 3,293,472 | 12/1966 | Stevens ................................ | 310/260 |
| 3,949,257 | 4/1976 | Cooper et al. ....................... | 310/260 |
| 4,318,021 | 3/1982 | Johansson et al. .................. | 310/260 |
| 4,618,795 | 10/1986 | Cooper et al. ....................... | 310/260 |
| 5,140,740 | 8/1992 | Weigelt ................................ | 29/596 |
| 5,355,046 | 10/1994 | Weigelt ................................ | 310/260 |
| 5,436,520 | 7/1995 | Huber ................................... | 310/260 |
| 5,485,050 | 1/1996 | Zimmermann ....................... | 310/260 |
| 5,583,388 | 12/1996 | Paroz et al. .......................... | 310/260 |

FOREIGN PATENT DOCUMENTS

| | | |
|---|---|---|
| 0432720B1 | 2/1995 | European Pat. Off. . |
| 4406400A1 | 8/1995 | Germany . |

*Primary Examiner*—Nestor Ramirez
*Assistant Examiner*—Joseph Waks
*Attorney, Agent, or Firm*—Burns, Doane, Swecker & Mathis, L.L.P.

[57] ABSTRACT

In an electric machine (10), in particular a generator or motor, which is accommodated in a machine housing (11) and comprises a stator winding which passes through a stator core (13) and which merges on the end face into an overhang (31) which is mounted in a braced manner in order to absorb dynamic loads, flexible readjustment is achieved by providing, on the overhang mounting, means (20, 21, 29, 30) for retensioning the overhang (31) which are actuable from outside the machine housing (11) and which allow retensioning during operation.

8 Claims, 1 Drawing Sheet

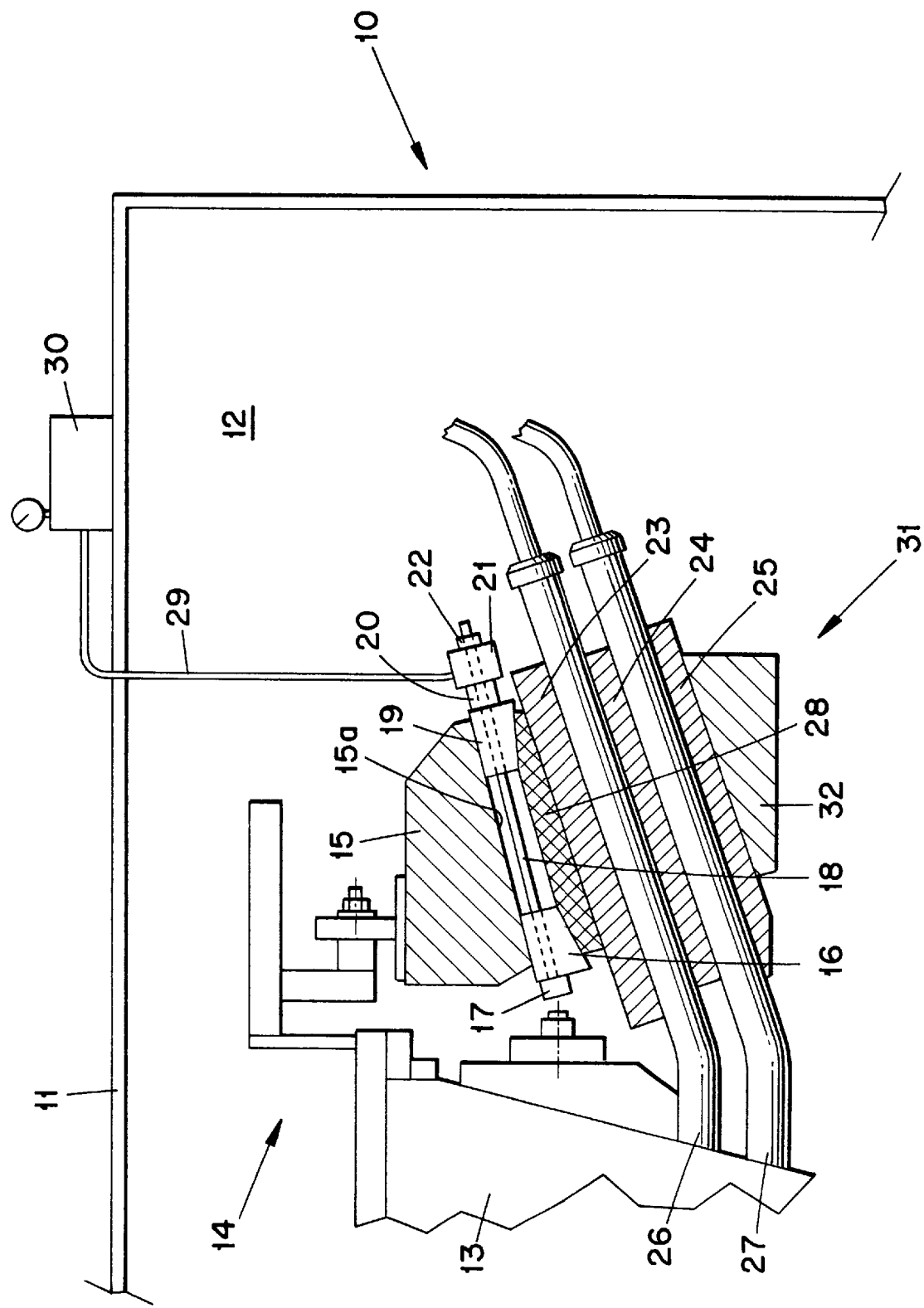

ELECTRIC MACHINE WITH A BRACED OVERHANG

BACKGROUND OF THE INVENTION

1. Field of the Invention

The present invention relates to the field of electric machines. It refers to an electric machine, in particular a generator or motor, said electric machine being accommodated in a machine housing and comprising a stator winding which passes through a stator core and which merges on the end face into an overhang which is mounted in a braced manner in order to absorb dynamic loads.

Such an electric machine is known, for example, from the publication EP-B1-0,432,720.

2. Discussion of Background

In the case of stator overhangs of large electric machines, such as, for example, turbogenerators, with a directly $H_2$-cooled stator winding, high dynamic stresses occur during operation, and these are to be absorbed and rendered harmless by suitably mounting the overhangs and keeping them braced in the mounting. The publication mentioned initially proposes bracing, in which the overhang rests on an inner ring and is pressed against the inner ring by suitable bracing means. In FIG. 4 of this publication, pairs of clamping wedges (16a, b) are proposed as bracing means, said clamping wedges pressing onto a clamping plate (transmitter 15a) and being supported on the inside of a supporting element (angle piece 13a) fastened to the stator core. The clamping wedges can be moved toward one another by means of a common clamping screw and thus press the clamping plate against the overhang.

One disadvantage of this type of bracing is that it is complicated to adjust and inflexible to handle. If the mechanical prestresses or the mounting geometry of the overhang change as a result of the loads occurring while the machine is in operation, these changes can be compensated only by shutting down the machine, opening the machine housing and suitably tightening the screw connections (of the clamping wedges) in the region of the overhang mounting. Problems presented by such maintenance are, on the one hand, the considerable downtimes of the machine which must be taken into account in addition to the actual maintenance outlay. On the other hand, however, readjusting the bracing itself also presents problems, since the effect of the readjustment can be checked with absolute certainty only while the machine is running, the ultimate result of this being that the machine is shut down and started up several times.

SUMMARY OF THE INVENTION

The object of the invention is, therefore, to redesign a machine of the type initially mentioned, in such a way that the abovementioned disadvantages are eliminated and it becomes possible for the overhang mounting to be readjusted quickly and accurately and in a way which is simple in terms of design and functioning.

In a machine of the type initially mentioned, the object is achieved by providing, on the overhang mounting, means for retensioning the overhang which are actuable from outside the machine housing and allow retensioning during operation. The retensioning means according to the invention, which are capable of being operated from outside, make it possible for retensioning to be carried out, without the machine housing having to be opened. This already results in considerable time savings. However, since retensioning can also be carried out while the machine is in operation, the maintenance time can be further reduced and a machine standstill avoided. In particular, the retensioning effect can be checked directly during the retensioning operation, for example by using suitable diagnostic means, such as vibration sensors. Furthermore, uniform prestressing of all the supports of the overhang mounting can be implemented in a particularly simple way with the aid of the "remotely controllable" retensioning means.

A first preferred embodiment of the invention is defined in that the overhang rests on an inner ring arranged coaxially to the machine axis and is surrounded on the outside by supporting elements which are fastened to the stator core and which each have a supporting face running essentially parallel to the outer face of the inner ring, in that clamping plates are provided between the overhang and the supporting elements, said clamping plates pressing the overhang against the outer face of the inner ring, and in that clamping wedges cooperating with the retensioning means are arranged between the clamping plates and the supporting elements, said clamping wedges being supported on the supporting faces of the supporting elements and pressing the clamping plates against the overhang. Using the clamping wedges makes it possible to apply, distributed over a large area, high clamping forces which can be generated in a simple way by the linear introduction of force.

A second preferred embodiment of the machine according to the invention is distinguished in that the clamping wedges are arranged in pairs on opposite sides of the clamping plates, in that the clamping wedges of a pair are arranged mirror symmetrically and, by being moved toward one another, prestress the associated clamping plate, in that the clamping wedges can be moved toward one another by means of a common tension rod and, together with the tension rod, form a clamping device, in that the tension rod is fastened at one end to a first clamping wedge of the pair, in that the second clamping wedge of the pair is arranged movably on the tension rod, and in that there is a device which is supported on an abutment on the tension rod and displaces the second clamping wedge in the direction of the first clamping wedge. Highly uniformly distributed clamping forces can thereby be generated and maintained in a way which is very simple in terms of design and is functionally reliable during operation.

Preferably, the device for displacing the second clamping wedge is a hydraulic press which is supplied with the necessary working pressure via a delivery line from a pressure supply arranged outside the machine housing. The hydraulics are insensitive to high tensions and magnetic fields, can generate high forces and can be assembled in a simple way from standard components.

BRIEF DESCRIPTION OF THE DRAWING

A more complete appreciation of the invention and many of the attendant advantages thereof will be readily obtained as the same becomes better understood by reference to the following detailed description, when considered in connection with the accompanying drawing, wherein the single FIGURE shows a detail of a preferred exemplary embodiment of the overhang bracing according to the invention.

DESCRIPTION OF THE PREFERRED EMBODIMENTS

Referring now to the drawing, the FIGURE reproduces a detail of a preferred exemplary embodiment of an overhang mounting and bracing according to the invention. The electric machine 10 comprises, in the interior 12 of a closed-off machine housing 11, a rotor (not shown) rotating about a machine axis and a stator having a stator winding which passes through a stator core 13 and of which two winding bars 26 and 27 are illustrated in the FIGURE. The winding bars, coming from the stator core 13, merge into an overhang 31 which is mounted in a braced manner for reasons of mechanical stability toward the dynamic stresses occurring during operation.

For mounting, the overhang 31, which widens conically outward and comprises a stack composed of the winding bars 26, 27 and of suitable interlayers 23, 24 and 25, rests on an inner ring 32 arranged coaxially to the machine axis and having a conical outer face. The overhang 31 is braced against the inner ring 32 by clamping plates 28 which are pressed onto the overhang 31 from the other side and on which pairs of clamping wedges 16, 19 lying mirror symmetrically to one another act in each case with the necessary clamping force. For this purposes, the clamping wedges 16, 19 are supported in each case on supporting faces 15a of supporting elements 15 surrounding the overhang 31 on the outside, said supporting faces being oriented parallel to the outer face of the inner ring 32. The supporting elements 15 are themselves fastened to the stator core 13 via suitable fastening devices 14.

The clamping mechanism comprises, in addition to the clamping wedges 16, 19, a tension rod 18 which passes through both clamping wedges 16, 19 of a pair of wedges. A first abutment 17, on which one clamping wedge 16 is supported, is provided at one end of the tension rod 18. Arranged at the other end of the tension rod 18 is a second abutment 22, on which is supported a hydraulic press 21 which presses with a piston 20 against the other clamping wedge 19 from the rear. The hydraulic press 21 is supplied with pressure, via an inwardly leading delivery line 29, from a pressure supply 30 located outside the machine housing 11. When an appropriate pressure is applied, forces act, in conjunction with the tension rod 18, on the clamping wedges 16, 19, said forces in each case being directed toward the other clamping wedge and, due to the wedge effect, pressing the clamping plate 28 against the overhang 31.

Each of the clamping devices arranged around the overhang 31 can thus be adjusted quickly and accurately and, above all, individually to the desired prestress, via the associated hydraulic press, by the application of an appropriate hydraulic pressure. In particular, the mounting can be retensioned while the machine is in operation, without the machine having to be stopped or the machine housing 11 opened. In this case, using clamping wedges 16, 19 in pairs gives rise, in conjunction with the clamping plate 28, to a highly uniform distribution of the pressing force. So that the hydraulic pressure can be lowered again after the desired bracing has been achieved, it is expedient and advantageous to equip the clamping device, consisting of the clamping wedges 16, 19 and tension rod, with a ratchet mechanism, in which the clamping wedge 19 movable on the tension rod engages, after being displaced by the hydraulic press 21, in such a way that, when the hydraulic press is relieved of pressure, the prestress on the pair of wedges is maintained.

It goes without saying that, within the scope of the invention, other mechanically, electrically or magnetically acting means may also be used for retensioning, in addition to the hydraulic means. In this case, however, it is necessary to ensure that these means also operate reliably under the conditions prevailing while the machine is in operation and do not present any problems as regards the safety of the operating personnel.

Altogether, the invention provides a machine with overhang mounting which is distinguished by the following properties and advantages:

the overhang support can be retensioned with the aid of an external device, without the machine being opened;

retensioning is carried out preferably via a hydraulic press which is supplied with pressure from an external pressure supply;

the clamping device is preferably equipped with a ratchet mechanism, so that, even after the press has been relieved of pressure, the prestress on the two wedges and therefore on the entire overhang support can be maintained;

there is a sharp reduction in the time required during inspections;

retensioning can be carried out both "in operation" and at standstill;

uniform prestressing of all the supports is ensured;

there is no need to open the generator or motor (claddings, etc.);

possible signs of a loose overhang, such as, for example, higher vibrations and abrasion, can be diagnosed by vibration sensors during operation and by means of endoscopes through special orifices in the housing and can be eliminated by retensioning;

the system according to the invention can be used in $H_2$-cooled and in air-cooled generators/motors.

Obviously, numerous modifications and variations of the present invention are possible in the light of the above teachings. It is therefore to be understood that, within the scope of the appended claims, the invention may be practised otherwise than is specifically described herein.

What is claimed as new and desired to be secured by Letters Patent of the United States is:

1. An electric machine, in particular a generator or motor, said electric machine being disposed in a machine housing and comprising: a stator winding wich passes through a stator core and which merges on an end face into an overhang, said stator winding being mounted in a braced manner for absorbing dynamic loads, and overhang mounting means for retensioning the overhang, wherein said overhead mounting means are actuable from outside the machine housing for allowing retensioning of the overhang during operation of the electric machine.

2. The machine as claimed in claim 1, wherein the overhang (31) rests on an inner ring (32) arranged coaxially to a machine axis and is surrounded on an outside by supporting elements (15) which are fastened to the stator core (13) and which each have a supporting face (15a) running essentially parallel to an outer face of the inner ring (32), wherein clamping plates (28) are provided between the overhang (31) and the supporting elements (15), said clamping plates pressing the overhang (31) against the outer face of the inner ring (32), and wherein clamping wedges (16, 19) cooperating with retensioning means (20, 21, 29, 30) are arranged between the clamping plates (28) and the supporting elements (15), said clamping wedges being supported on the supporting faces (15a) of the supporting elements (15) and pressing the clamping plates (28) against the overhang (31).

3. The machine as claimed in claim 2, wherein the clamping wedges (16, 19) are arranged said pair on opposite sides of the clamping plates (28).

4. The machine as claimed in claim 3, wherein the clamping wedges (16, 19) of a pair are arranged mirror symmetrically and, by being moved toward one another, prestress an associated clamping plates (28), and wherein the clamping wedges can be moved toward one another by means of a common tension rod (18) and, together with the tension rod (18), form a clamping device.

5. The machine as claimed in claim 4, wherein the tension rod (18) is fastened at one end to a first one of said clamping wedges (16) of the pairs, wherein a second clamping wedges (19) of the pairs is arranged movably on the tension rod (18), and wherein there is a device (21) which is supported on an abutment (22) on the tension rod (18) and displaces the second clamping wedge (19) in a direction of the first clamping wedge.

6. The machine as claimed in claim 5, wherein the device for displacing the second clamping wedge (19) is a hydraulic press (21).

7. The machine as claimed in claim 6, wherein the hydraulic press (21) is supplied with a necessary working pressure, via a delivery line (29), from a pressure supply (30) arranged outside the machine housing (11).

8. The machine as claimed in claim 6, wherein the clamping device (16, 18, 19) comprises a ratchet mechanism, in such a way that, when the hydraulic press (21) is relieved of pressure, the prestress on the pair of wedges (16, 19) is maintained.

* * * * *